Aug. 30, 1932.  H. W. FLETCHER  1,874,035

WELL STRAINER AND PROCESS OF MAKING SAME

Filed Sept. 12, 1931

H. W. FLETCHER INVENTOR

BY *Jesse R. Stone*

ATTORNEY

Patented Aug. 30, 1932

1,874,035

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

WELL STRAINER AND PROCESS OF MAKING SAME

Application filed September 12, 1931. Serial No. 562,531.

My invention relates to well strainers such as are employed in equipping oil, gas and water wells.

It is an object of the invention to provide a well strainer so constructed as to resist wear and erosion such as it is subjected to in deep wells where a large amount of sand and similar abrasive material tends to enter the well.

I desire to provide a wall for the strainer having fine straining openings throughout its entire length, and to vary the size of said openings in a simple manner by varying the size of the shot or granular material employed in the construction of the screen.

It is a further object to provide a process of assembling the screen which is cheap and simple to use and which will produce a uniform product.

I desire to cement securely together a mass of fine metal particles by my process so that the porous wall thus produced will resist wear for long periods.

In the drawing herewith Fig. 1 shows a side view, partly in elevation and partly in central vertical section showing a well screen constructed in accordance with my invention.

Figure 3:
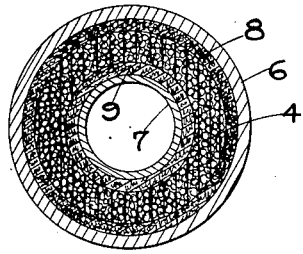
Fig. 3 is a transverse section through the strainer shown in the mold in which it is formed.

In constructing my screen I take two concentric tubes of iron or steel spaced apart a sufficient amount to provide an annular chamber between them into which my strainer wall may be formed. These two tubes are shown at 6 and 7 in Fig. 3. They are first boiled in a bath of hydrochloric acid until the metal has absorbed a material amount of hydrogen. The space between the two walls is lined with layers of asbestos 8 and 9 to separate straining particles from the wall of the mold. The lower end of the annular chamber is closed by a terminal pin member shown at 1 in Fig. 1.

The pin member 1 forms part of the strainer. It is of nickel or other preferred metal and is threaded at 2 for engagement with an adjacent coupling or collar. The annular chamber is then filled with the screening material. This may be granular material of uniform particles and preferably of a metal such as nickel or nickel alloy. I prefer to use shot made of nickel. By so doing, I get more uniform straining passages between the particles. These shot fill the annular space and are tamped and shaken into closely interfitting position.

The upper collar or box member 3 is then placed in position upon the layer 4 of shot. This is a ring threaded on its inner surface at 5 to couple onto an adjacent tool joint or the like.

The assembled pipes with the two coupling members in position and the nickel shot well tamped in place are then placed in a furnace and subjected to a temperature of approximately 1800° F. for a period of several hours, the best results being obtained by heating from 20 to 30 hours.

Figure 1:
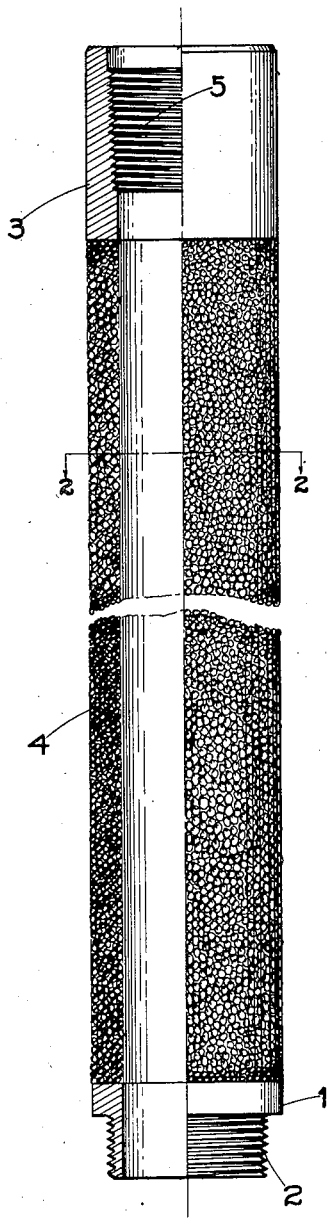
Figure 2:
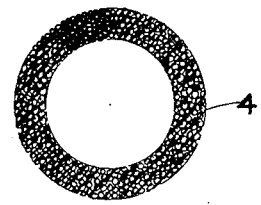
Fig. 2 is a transverse section on the plane 2—2 of Fig. 1.

When thus treated, the mold may be removed from the screen of shot which will be found to be cemented together into a rigid tubular member as shown in Fig. 1. The shot are cemented to each other and to the end collars 1 and 3 forming a complete strainer ready for use. The layers of asbestos prevent the parts of the screen from adhering to the pipes which form the mold and allows the easy separation of the screen therefrom.

Just what occurs to cement the particles constituting the strainer wall together is not accurately ascertained. The iron pipes constituting the mold when boiled in hydrochloric acid are believed to deliver up nascent hydrogen which acts to prevent oxidation of the nickel, and to promote union of the shot at all contact points.

The heat to which the parts is subjected is well below the melting point of both nickel and iron and sufficient to heat the metal only a little above a red heat, but a bond between the contacting surfaces of the shot and between the shot and the metal ends is formed which holds them rigidly together. This may be due partly to sublimation of the metal under the heat in the presence of the released hydrogen.

The strainer thus formed is hard and resistant to wear and lasts for comparatively long periods of time in use. It is cheap to manufacture and effective in use.

What I claim as new is:

1. A well screen comprising a tubular member made up of metal shot bonded to each other at their points of contact, a metallic socket at one end and a pin at the other end of said member cemented to said shot whereby said member may be secured to adjacent pipe connections.

2. A process of making well screen including placing particles of metal in a tubular mold, placing coupling members at each end thereof and heating said mold to a temperature above a red heat in the presence of hydrogen, and then removing the finished screen from the mold.

3. A process of making well screen comprising placing metallic shot in an annular mold, tamping said shot closely together, placing coupling rings at each end of said mold in contact with said shot, heating the mold to a temperature of approximately 1800° F. several hours in the presence of hydrogen, and then removing the screen from the mold.

4. A process of making well screen comprising forming a mold of two concentric metal pipes spaced apart, boiling said mold in hydrochloric acid, filling said mold with metallic particles, placing coupling members on said particles at each end of the mold, and heating said mold for a period sufficient to produce union of the particles at contact points.

5. A process of making well screen including forming a tubular mold of two concentric pipes spaced apart, filling the space between said pipes with metal particles, tamping said particles closely together and heating said mold and said particles in the presence of hydrogen to a temperature above a red heat but below the point of fusion of the metal and maintaining the same at that temperature for several hours.

In testimony whereof, I hereunto affix my signature this 9th day of September, A. D., 1931.

HAROLD W. FLETCHER.